United States Patent
Faust et al.

(10) Patent No.: US 6,906,662 B2
(45) Date of Patent: Jun. 14, 2005

(54) TIME DOMAIN REFLECTOMETRY MEASUREMENT INSTRUMENT

(75) Inventors: Anthony Faust, Mundelein, IL (US); Lary Soroka, Geneva, IL (US); Mark Twaddle, Lisle, IL (US)

(73) Assignee: Magnetrol International, Incorporated, Downers Grove, IL (US)

( * ) Notice: Subject to any disclaimer, the term of this patent is extended or adjusted under 35 U.S.C. 154(b) by 262 days.

(21) Appl. No.: 10/104,073

(22) Filed: Mar. 21, 2002

(65) Prior Publication Data

US 2002/0101250 A1 Aug. 1, 2002

Related U.S. Application Data

(62) Division of application No. 09/336,194, filed on Jun. 18, 1999, now Pat. No. 6,626,038.
(60) Provisional application No. 60/089,756, filed on Jun. 18, 1998.

(51) Int. Cl.[7] .............................................. G01S 13/00
(52) U.S. Cl. ...................................................... 342/124
(58) Field of Search .......................... 356/73.1; 73/149, 73/290 R, 294, 304 R, 304 C, 290 B, 290 C; 342/118, 123, 124, 127, 131–145, 175, 195, 21, 22, 165, 173; 324/642–646, 332–343

(56) References Cited

U.S. PATENT DOCUMENTS

| | | |
|---|---|---|
| 5,361,070 A | 11/1994 | McEwan |
| 5,457,394 A | 10/1995 | McEwan |
| 5,465,094 A | 11/1995 | McEwan |
| 5,650,728 A * | 7/1997 | Rhein et al. ................ 324/543 |
| 5,672,975 A | 9/1997 | Kielb et al. |
| 6,104,200 A * | 8/2000 | Hook ......................... 324/643 |
| 6,121,780 A * | 9/2000 | Cruickshank et al. ....... 324/643 |

\* cited by examiner

*Primary Examiner*—Tu T. Nguyen
(74) *Attorney, Agent, or Firm*—Wood, Phillips, Katz, Clark & Mortimer (57) ABSTRACT

A time domain reflectometry measuring instrument uses a microprocessor that provides added functionality and capabilities. The circuit electronics and probe are tested and calibrated at the factory. Installation and commissioning by the user is simple. The user installs the probe. The transmitter is attached to the probe. The user connects a standard shielded twisted pair to the electronics. Power is applied and the device immediately displays levels. A few simple parameters may need to be entered such as output characteristics and the process material dielectric constant.

7 Claims, 7 Drawing Sheets

TIME DOMAIN REFLECTOMETRY MEASUREMENT INSTRUMENT

CROSS-REFERENCE

This application is a division of Ser. No. 09/336,194 filed Jun. 18, 1999, now U.S Pat. No. 6,626,038. This application claims priority on Provisional Application Ser. No. 60/089,756 filed Jun. 18, 1998.

FIELD OF THE INVENTION

This invention relates to an apparatus and method utilizing time domain reflectometry for measuring the condition or characteristics of a material.

BACKGROUND OF THE INVENTION

Knowledge of level in industrial process tanks or vessels has long been required for safe and cost-effective operation of plants. Many technologies exist for making level measurements. These include buoyancy, capacitance, ultrasonic and microwave radar, to name a few. Recent advantages in micropower impulse radar (MIR), also known as ultra-wide band (UWB) radar, in conjunction with advances in equivalent time sampling (ETS), permit development of low power and low cost time domain reflectometry (TDR) devices. Existing TDR devices are expensive and often impractical for industrial level instrumentation.

In a TDR instrument, a very fast pulse with a rise time of 500 picoseconds, or less, is propagated down a transmission line that serves as a probe in a vessel. The pulse is reflected by a discontinuity caused by a transition between two media. For level measurement, that transition is typically where the air and the material to be measured meet. The amplitude of the reflected signal depends on the difference between the dielectrics of the two media. The dielectric of air is one, while the dielectric of water is about eighty. The larger the difference in dielectric, the larger the reflected signal.

McEwan, U.S. Pat. No. 5,345,471, and other related patents, describe a technique to transmit and receive very fast pulses with simple, low cost and low power electronics. More particularly, McEwan, U.S. Pat. No. 5,609,059, describes a level sensor utilizing this technology. However, the device described therein is intended to be used for simple commercial level applications, such as automobile engine fluid levels. It does not utilize the feature set, power consumption, and versatility required for use in the industrial process environment. Other known devices utilize this technology for a two-wire transmitter using just two wires for both receiving power from the user and sending level information to the user. However, these devices are analog devices limited in the ability to measure the level of extremely low dielectric materials, or materials that coat, clump or build up on the probe, over the wide temperature extremes of industrial process level environments. They also have limited level range capability.

The present invention is directed to overcoming one or more of the problems discussed above, in a novel and simple manner.

SUMMARY OF THE INVENTION

In accordance with the invention there is provided a TDR measurement instrument including improved diagnostic and measurement features.

In accordance with one aspect of the invention, there is disclosed a measurement instrument utilizing self diagnostics.

In accordance with another aspect of the invention, there is provided a TDR measurement instrument utilizing automated zoom scaling.

Broadly, there is disclosed herein a time domain reflectometry measurement instrument comprising a probe defining a transmission line. A pulse circuit is connected to the probe for generating pulses on the transmission line and receiving reflected pulses returned on the transmission line, the reflected pulses representing a characteristic of a material being measured. An equivalent time sampling circuit is connected to the pulse circuit for developing an equivalent time representation of the reflected pulses over an expanded time scale within the region of interest. An automatic scale circuit is operatively associated with the sampling circuit for automatically selecting location and size of the region of interest corresponding to characteristics of the probe.

More particularly, the instrument uses a microprocessor that enables added functionality and capabilities. The electronics and probe are tested and calibrated at the factory. Installation and commissioning by the user is simple. The user installs the probe. The transmitter is screwed on the top of the probe. The user connects a standard shielded twisted pair electrical cable to the electronics. Power is applied and the device immediately displays levels. A few simple parameters may need to be entered such as output characteristics and the process material dielectric constant.

Further features and advantages of the invention will be readily apparent from the specification and from the drawing.

DETAILED DESCRIPTION OF THE INVENTION

Figure 1:
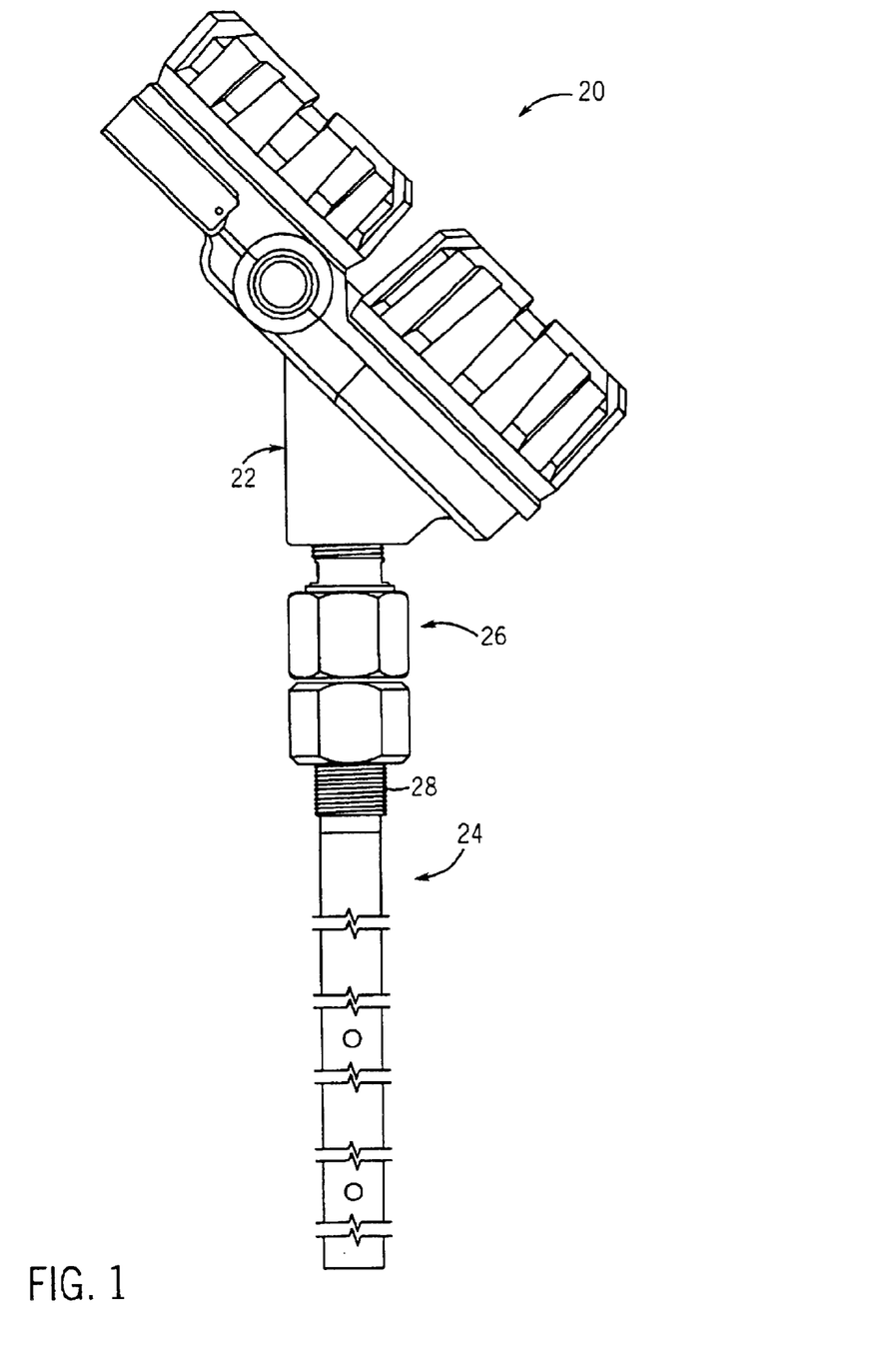
FIG. 1 is a side elevation view of a measurement instrument in accordance with the invention.

Referring to FIG. 1, a process instrument 20 according to the invention is illustrated. the process instrument 20 uses micropower impulse radar (MIR) in conjunction with equivalent time sampling (ETS) and ultra-wide band (UWB) transceivers for measuring level. Particularly, the instrument 20 uses guided wave radar for sensing level. While the embodiment described herein relates to an MIR level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is typically mounted to a process vessel (not shown) using a threaded fitting 28. The housing 22 is then secured to the probe 24 as by threading the connector 26 to the probe 24 and also to the housing 22.

These components may be as generally described in Mulrooney et al., U.S. patent application Ser. No. 09/094,142, filed Jun. 9, 1998, the specification of which is hereby incorporated by reference herein. As described therein, the probe 24 comprises a high frequency transmission line which, when placed in a fluid, can be used to measure level of the fluid. Particularly, the probe 24 is controlled by electronics in the housing 22 for determining level in the vessel.

Figure 2:
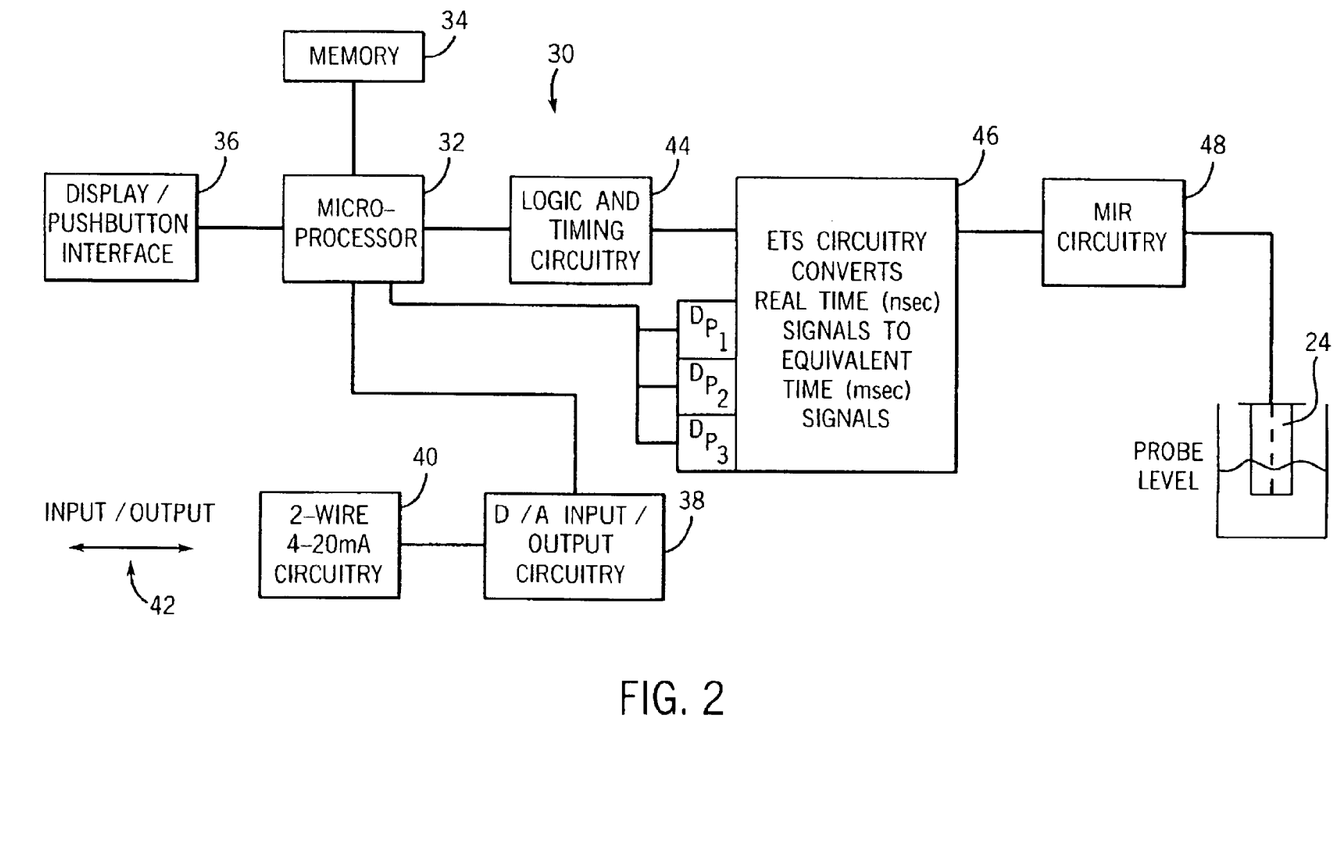
FIG. 2 is a block diagram of a control circuit for the instrument of FIG. 1.

Referring to FIG. 2, the electronics mounted in the housing 22 of FIG. 1 are illustrated in block diagram form as a control circuit 30 connected to the probe 24. The control circuit 30 includes a microprocessor 32 connected to a suitable memory 34 (the combination forming a computer) and a display/pushbutton interface 36. The display/pushbutton interface 36 may be as generally described in the Mulrooney et al. application incorporated by reference herein, and is used for entering parameters with a keypad and displaying user information. The memory 34 comprises both non-volatile memory for storing programs and calibration parameters, as well as volatile memories used during level measurement, as described below.

The microprocessor 32 is also connected to digital to analog input/output circuitry 38, which is in turn connected to two-wire 4–20 mA circuitry 40 for connecting to remote devices as represented by an input/output line 42. Particularly, the two-wire circuitry 40 utilizes loop control and power circuitry which is well known and commonly used in process instrumentation. The power is provided on the line 42 from an external power supply. The circuitry 40 controls the current on the two-wire line 42 which represents level or other characteristics measured by the probe 24.

The microprocessor 32 is also connected via logic and timing circuitry 44 to an ETS circuit 46. The logic and timing circuitry 44 converts signals to appropriate levels and coordinates timing of such signal levels. The ETS circuit 46 is connected via an MIR circuit 48 to the probe 24.

Figure 3:
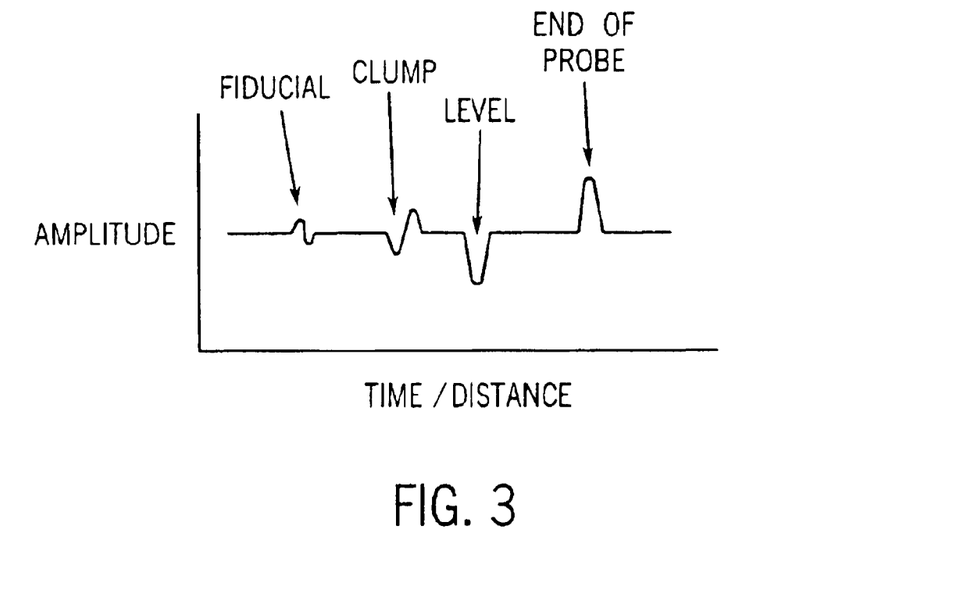
FIG. 3 is a timing diagram illustrating a return signal received by the circuit of FIG. 2.

The ETS circuitry 46 and the MIR circuitry 48 are known and are generally in accordance with the teachings of McEwan, U.S. Pat. Nos. 5,345,471 and 5,609,059, the specifications of which are hereby incorporated by reference herein. The MIR circuitry 48 generates very fast pulses of 500 picoseconds or less rise time. The timing between pulses is tightly controlled. The reflected pulses are sampled at controlled intervals. The samples build a time multiplied "picture" of the reflected pulses. A typical picture is illustrated in FIG. 3. All of the pulses shown in FIG. 3 will not be present at the same time. A clump pulse occurs only when the material measured forms a clump on the probe. When a level pulse is present typically there is no end of probe reflection. Since the pulses travel in the probe at the speed of light, this picture represents approximately ten nanoseconds in real time for a five-foot probe. The ETS circuitry 46 converts the time to about 71 milliseconds. As is apparent, the exact time would depend on various factors, such as, for example, probe length. The largest signals have an amplitude of the order of 20 millivolts before amplification to the desired amplitude by common audio amplifiers. For a low power device, a threshold scheme is employed to give timed interrupts to the microprocessor 32 for each of the signals, namely, fiducial, clump, level, and end of probe, see FIG. 3. The microprocessor 32 converts these timed interrupts into distance. With the probe length entered through the display/pushbutton interface 36, or some other interface, the microprocessor 32 can calculate the level by subtracting from the probe length the difference between the fiducial and level distances.

In accordance with the invention, the known ETS circuitry 46 is modified to include digital control by microprocessor 32 of selected circuit parameters. Here, three digital potentiometers labeled DP1, DP2 and DP3 receive digital commands, having one of 256 settings representing desired resistance, from the microprocessor 32. The commanded resistance varies operation of the ETS circuitry 46 for controlling the signal sent via the logic and timing circuitry 44 to the microprocessor 32.

Prior art level transmitters primarily utilize analog potentiometer adjustments for various probe lengths, or may have a single setting for the maximum probe length, relying on linearity of electronics to provide level measurement with a shorter probe. These approaches limit accuracy and resolution of a level measurement. They also create difficulties during field servicing of the level transmitters. If electronics must be replaced in the field, then all the calibrations and adjustments have to be made there as well, which requires more highly qualified field personnel, special test equipment, and more time to perform such procedures. In accordance with the invention, electronic zoom scaling allows the device to overcome these shortcomings. Electronic zoom scaling combines versatility, stability and universality of analog potentiometers with the capabilities of a microprocessor using the digital potentiometers DP1 to DP3. The adjustments made by the respective digital potentiometers DP1, DP2, and DP3 are range, window and gain.

Referring to FIG. 3, the curve illustrates the return signal received by the ETS circuitry 46. The MIR circuitry 48 generates and transmits a measurement pulse at some known time to the left of the amplitude axis. The returned fiducial signal is a reference signal based on a marker built into the instrument 20. Typically, the fiducial is positioned at some location along the probe, such as the top of the probe, higher than a highest level that can be sensed. The ETS circuitry 46 is configured to look for a return signal only in a region of interest (ROI). A window is defined as a time from when the pulse is transmitted to the beginning of the region of interest. The ETS circuitry 46 then looks for the received pulses only within the region of interest. The ETS circuitry 46 also utilizes an adjustable range. The range represents the length of the ROI beyond the end of the window to look for return signals. The first digital potentiometer DP1 is used to adjust the range. The second digital potentiometer DP2 is used to adjust the window. The range may be adjusted to include the fiducial signal and the end of probe signal.

The third potentiometer DP3 is used for the gain adjustment. The gain adjustment controls the amplitude of the return signal as will appear below. The amount of reflected energy depends on the dielectric of the material. The gain adjustment controls the amplitude of the analog signal regardless of the media.

The window and range are influenced by the tolerances of the electronic components of a given circuit board. This relationship is determined during the factory calibration of the electronics. The relevant calibration parameters are stored in an onboard memory by factory personnel. If a board has to be replaced in the field, then a new one is installed and the pertinent setup parameters are entered. No additional calibration with test equipment, potentiometer adjustments, or level measurement is necessary.

The proper combination of range and window adjustment, in accordance with the invention, allows increased resolution and accuracy of level measurements by "zooming in" on the ROI. Such ROI may be an interface between air and liquid, or an interface between air and solids, or an interface between two liquids, or any other area along the probe. The microprocessor 32 and digital potentiometers DP1–DP3 allow setting the location and size of the ROI and maintaining information about such selection with respect to the overall distance.

There is considerable interest in level measurement of materials with extremely low dielectric constants. Jet fuel and kerosene have a dielectric constant of the order of 1.7. Liquid nitrogen has a dielectric constant of the order of 1.45. The dielectric constant varies with temperature and with purity of the material. For these products, reflection coefficients are extremely small. By zooming in on a small ROI around the interface area, not only does the accuracy and resolution of the measurement increase, but it also allows for a lower sweep and therefore a larger number of pulses per inch. An increased number of pulses per inch increases the signal to noise ratio without increasing power consumption. Additionally, intentionally placed reference markers, or spacers, may be placed on the probe 24. This provides absolute distance references which can be used to determine material level on the probe.

Figure 4:
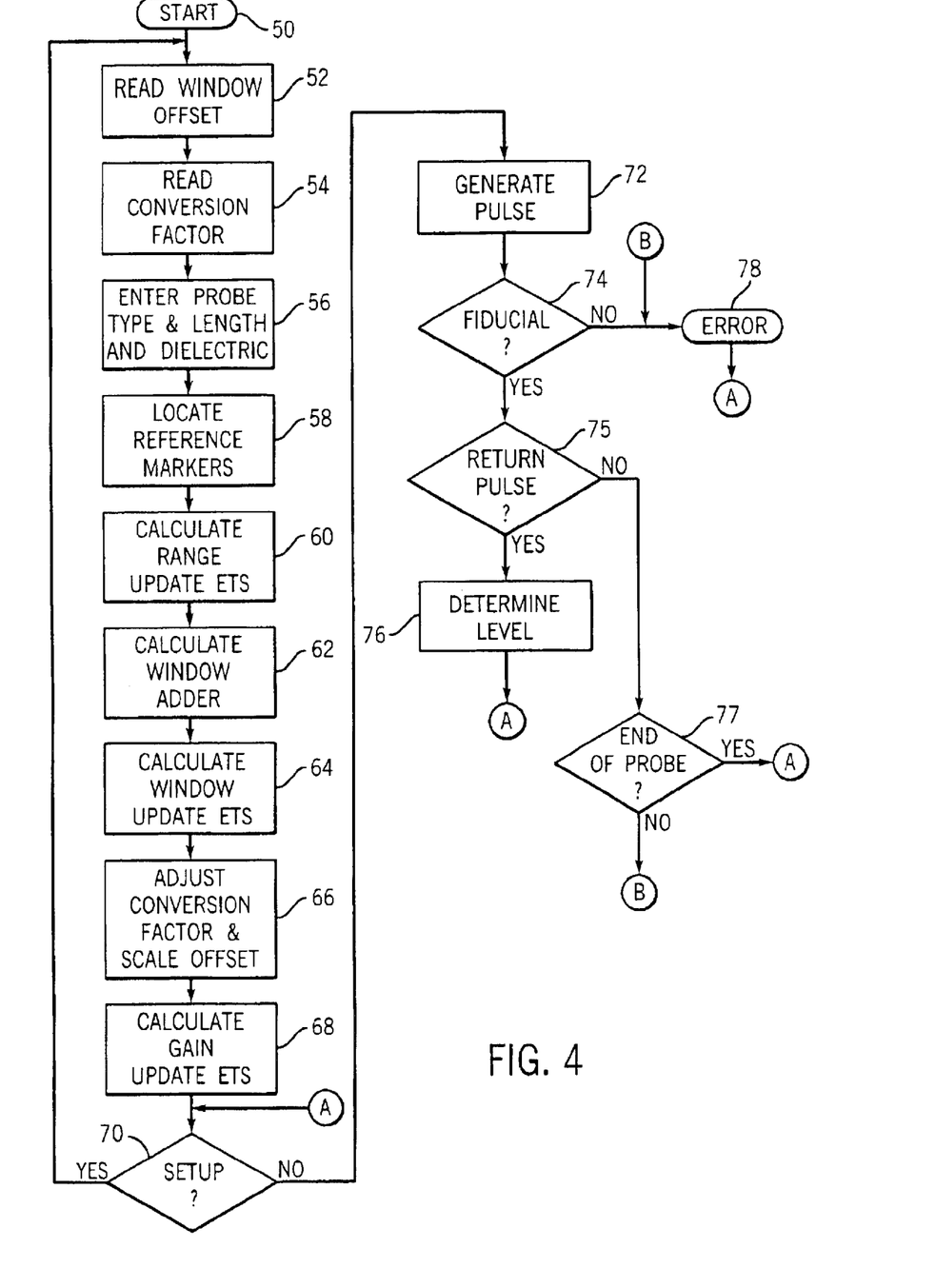
FIG. 4 is a flow diagram illustrating operation of a program by the microprocessor of FIG. 2.

Referring to FIG. 4, a flow diagram illustrates a program implemented in the microprocessor 32 of FIG. 2 for level measurement. As discussed above, the instrument 20 is factory calibrated. Particularly, the factory adjusts a parameter referred to as "window offset" so that a known marker in the probe 24, such as a fiducial, is located near the beginning of the ROI. The window offset value is stored in permanent memory for later recall. The factory then establishes a conversion factor which is a time multiplication factor representing distance per unit time, such as inches per second. The conversion factor is also stored in permanent memory. These calibrations reduce variations due to component tolerances.

The operation of the program in the microprocessor 32 begins at a start node 50. Thereafter, the window offset value is read from memory 34 at a block 52. The conversion factor is read from the memory 34 at a block 54. Using the display/pushbutton interface 36, the user enters the probe type, probe length and dielectric of the media at a block 56. Thereafter, the program enters an automatic setup routine for controlling further operation.

At a block 58 the program uses probe type and probe length information to determine the location of markers intentionally designed into the probe to provide known reference points. As described herein, the instrument 20 uses two markers. However, the software can support any number of markers located at known points along the length of the probe 24. The first is the fiducial at the top of the probe 24. The second marker is the end of probe 24. The end of probe 24 is an open circuit which generates a very high impedance. Calibration is done with no material covering the probe. Calibration of scaling parameters such as scale offset minimizes temperature and time drift of other parameters. Calibration is also used to set up the region of interest by determining the window and range.

The software automatically adjusts range to cover the distance between the two or more markers. This is done by either formulas or lookup table using empirically determined data at a block 60. The ETS circuitry 46 is updated by writing the range value to the range digital potentiometer DP1. At a block 62, the program automatically adjusts a window adder so that the desired marker is at the beginning of the ROI. A block 64 calculates a window value. The window value is equal to the sum of the window offset, read at the block 52, and the window adder calculated at the block 62. The ETS circuitry 46 is updated by writing the window value to the window digital potentiometer DP2. The window adder is determined either by formula or look-up table.

At a block 66, the program adjusts the conversion factor and scale offset based on the value of range calculated at the block 60 and the probe information entered by the user. This is also done either by formula or lookup table. Finally, a block 68 calculates the gain based on the probe type and dielectric information entered by the user. This is done by formula or lookup table. The ETS circuitry 46 is updated by writing the gain value to the gain digital potentiometer DP3.

Thereafter, a decision block 70 determines if it is necessary to return to the setup routine. Normally, the setup routine, comprising the blocks 52–68, is implemented only if a change is made by a user entering parameters using the display/pushbutton interface 36 at the block 56. Otherwise, the program remains in the level measurement routine.

The level measurement routine begins at a block 72, where a pulse is generated. As is apparent, the generation of the pulse actually consists of a repetitive pulse sequence using the ETS and MIR technologies. A decision block 74 determines if there has been a fiducial pulse, as shown in FIG. 3. If the fiducial pulse is received, decision block 75 determines if a return level pulse is received within the ROI after the fiducial. If so, then a block 76 determines level. This is done by measuring the time between the fiducial marker at the beginning of the ROI and the reflection from the media. The time is multiplied by the conversion factor and added to the scale offset to obtain the distance from the top of the probe to an interface of dissimilar materials. The level is the probe length minus the distance plus an offset, which is the distance from the end of the probe to a predetermined reference point. The routine then returns to the decision block 70. The level measurement routine is repeated unless the user has changed a parameter, in which event the setup routine is repeated.

If a return pulse is not received, as determined at the decision block 75, then a self diagnostic routine is entered. Particularly, an expected time of flight is known between the fiducial and the end of probe If no signal is received within that time, then the instrument 20 is not operating properly. A decision block 77 determines if an end of probe signal is detected within the expected time limit. If so, then the control returns to the decision block 70 and the level measurement routine is repeated unless the user has changed a parameter, in which event the setup routine is repeated.

If the fiducial signal or, in the absence of a level pulse, the end of probe signal is missing, an error condition is indicated at a block 78. An error message is given at display interface 36 and the current on two-wire line 42 is at an error level, e.g., less than 4 mA or more than 20 mA. The control returns to block 70, as described above.

Thus, for normal operation, the instrument 20 continues to measure level as long as the fiducial signal and a return level pulse or an end of probe pulse are received during an expected time period. However, when a setup parameter is changed, then the control returns to the setup routine for adjusting the electronic zoom scaling parameters.

Figure 5:
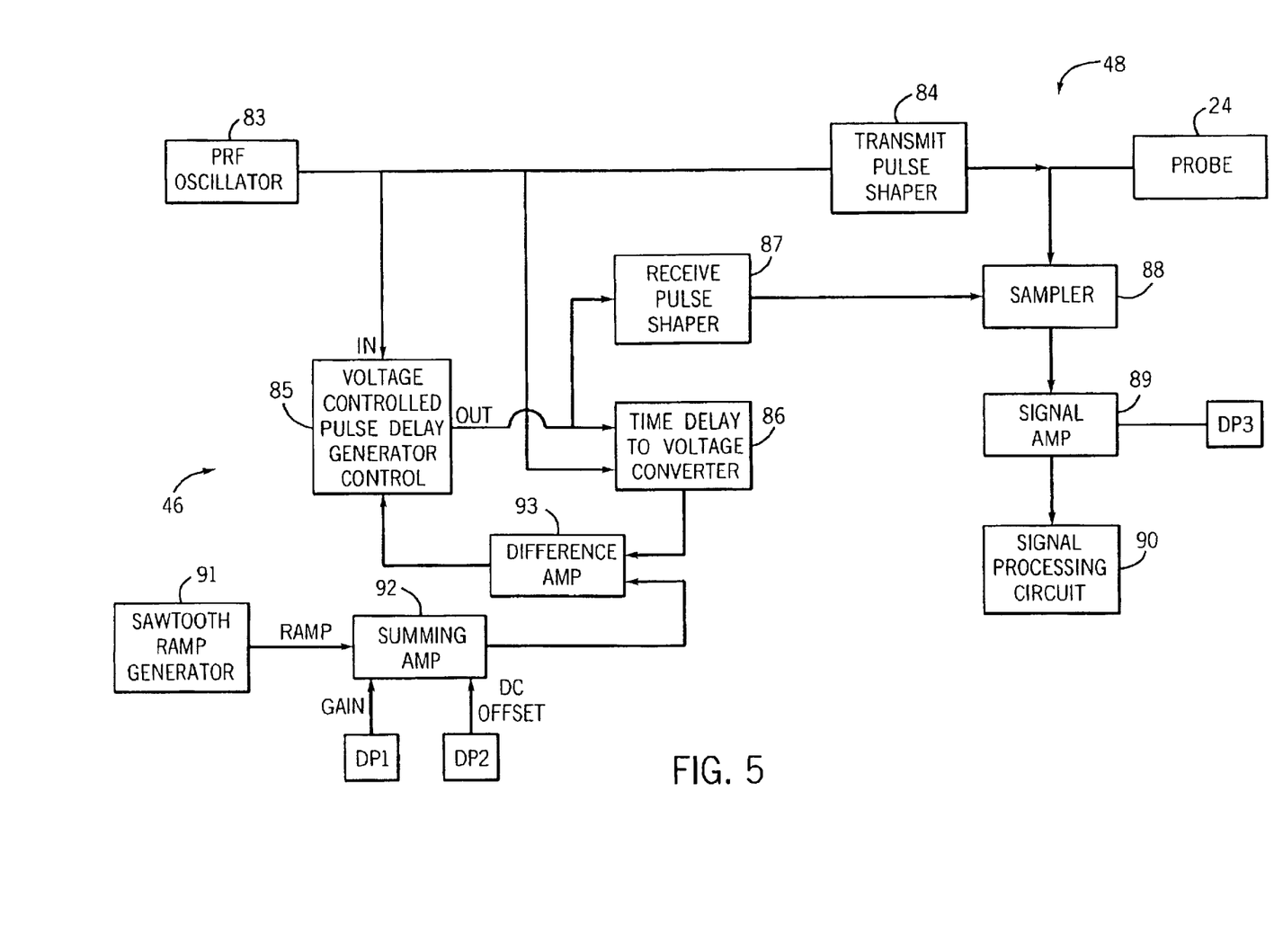
FIG. 5 is a block diagram of the ETS circuitry and MIR circuitry for the control circuit of FIG. 2.

As discussed above, the ETS circuitry 46 is modified to include the digital potentiometers DP1–DP3. Referring to FIG. 5, a block diagram illustrates the modified ETS circuitry 46 and the MIR circuitry 48 in block diagram form.

A pulse repetition frequency (PRF) oscillator 83 is connected to a transmit pulse shaper 84 which is in turn connected to the probe 24. The oscillator 83 is also connected to a pulse input of a voltage controlled pulse delay generator 85. Pulse outputs of the delay generator 85 and the oscillator 83 are also connected to a time delay to voltage converter 86. The output of the delay generator 85 is also connected to a receive pulse shaper 87 that is connected to a sampler 88. The sampler 88 is connected to the probe. An output of the sampler 88 is connected to a signal amplifier 89 which includes the gain digital potentiometer DP3. The signal amplifier 89 is in turn connected to a signal processing circuit 90 which transfers the return pulse signal to the microprocessor 32 of FIG. 2.

A sawtooth ramp generator 91 develops a sawtooth ramp as an input to a summing amplifier 92. The summing amplifier 92 is connected to the range potentiometer DP1 and the window potentiometer DP2. Range potentiometer DP1 sets gain, while Window potentiometer DP2 sets a DC offset applied to the ramp signal from the ramp generator 91. The output of the summing amplifier 92 is supplied as an input to a difference amplifier 93. The other input to the difference amplifier 93 is an output from the time delay to voltage converter 86. These input signals represent respectively a desired delay and an actual delay. The output of the difference amplifier is an error signal which is supplied to a control voltage input of the pulse delay generator 85.

The PRF oscillator 83 generates a pulse train at the frequency of the transmitted pulses. For each input pulse, the pulse delay generator 85 generates an output pulse with a delay that is controlled by its control voltage input. The delayed pulse passes through the receive pulse shaper 87 and is provided to the sampler 88. The sampler 88 samples the reflected pulses from the probe 24 at a time determined by the delayed and shaped receive pulse. The resulting low frequency sampled signal is amplified and passed on to further signal processing circuits 89 and 90. The amplifier gain is controlled by the computer controlled gain digital potentiometer DP3.

The PRF oscillator signal and the delayed pulse also are inputs to the time delay to voltage converter 86. The output of this converter 86 is a voltage proportional to the actual time delay between the transmit pulse from the PRF oscillator 83 and the receive pulse from the pulse delay generator 85 The voltage representing the measured delay is subtracted from a voltage representing the desired delay by the difference amplifier 93. The difference amplifier 93 output is an error signal that controls the time delay in the voltage controlled pulse delay generator 85. This feedback loop measures the actual pulse delay, compares it to the desired pulse delay, and forces the voltage controlled pulse delay generator 85 to adjust the actual pulse delay until it matches the desired delay. In this way, most nonlinearities and drifts in the voltage controlled pulse generator 85 have little or no effect on the actual pulse delay.

The voltage representing the desired delay is produced by the sawtooth ramp generator 91 and the summing amplifier 92. The summing amplifier amplifies the sawtooth ramp signal and adds a DC offset to the resulting signal. The DC offset voltage and the gain of the summing amplifier are controlled by the respective computer controlled digital potentiometers DP2 and DP1.

Automated control of the window (DC offset) and range (sawtooth ramp gain) using potentiometers DP1 and DP2 allows the microprocessor 32 to control the starting voltage and ending voltage of the sawtooth ramp representing the desired time delay, and therefore to control through the feedback loop the starting and ending time delay values actually applied to the sampler 88. Controlling these time delays, in turn, controls the distance down the probe 24 that the scan begins and ends, allowing the microprocessor 32 to scan any small or large portion of the probe as may be needed to easily identify a level reflection from the probe 24. All spurious signals, as reflections occurring from locations outside the scanned interval, are not seen by the signal processing circuits.

Microprocessor control of the gain potentiometer DP3 allows for adaptation to differing signal levels caused by differing dielectric constants of the reflecting medium and for differing signal amplitudes resulting from differing probe configurations.

The probe 24 may be a coaxial probe including a signal conductor surrounded by a ground sleeve. Such a coaxial probe and the cables exhibit an impedance of approximately 50 ohms. Another type of probe is a twin rod probe. This type of probe has a mismatch, typically beyond the fiducial. In accordance with the invention, a separation segment is used to provide impedance matching in the form of a gradual impedance change from the fiducial to the twin lead line. This enables the instrument to measure small dielectrics without interference from characteristics of the probe itself.

Figure 6:
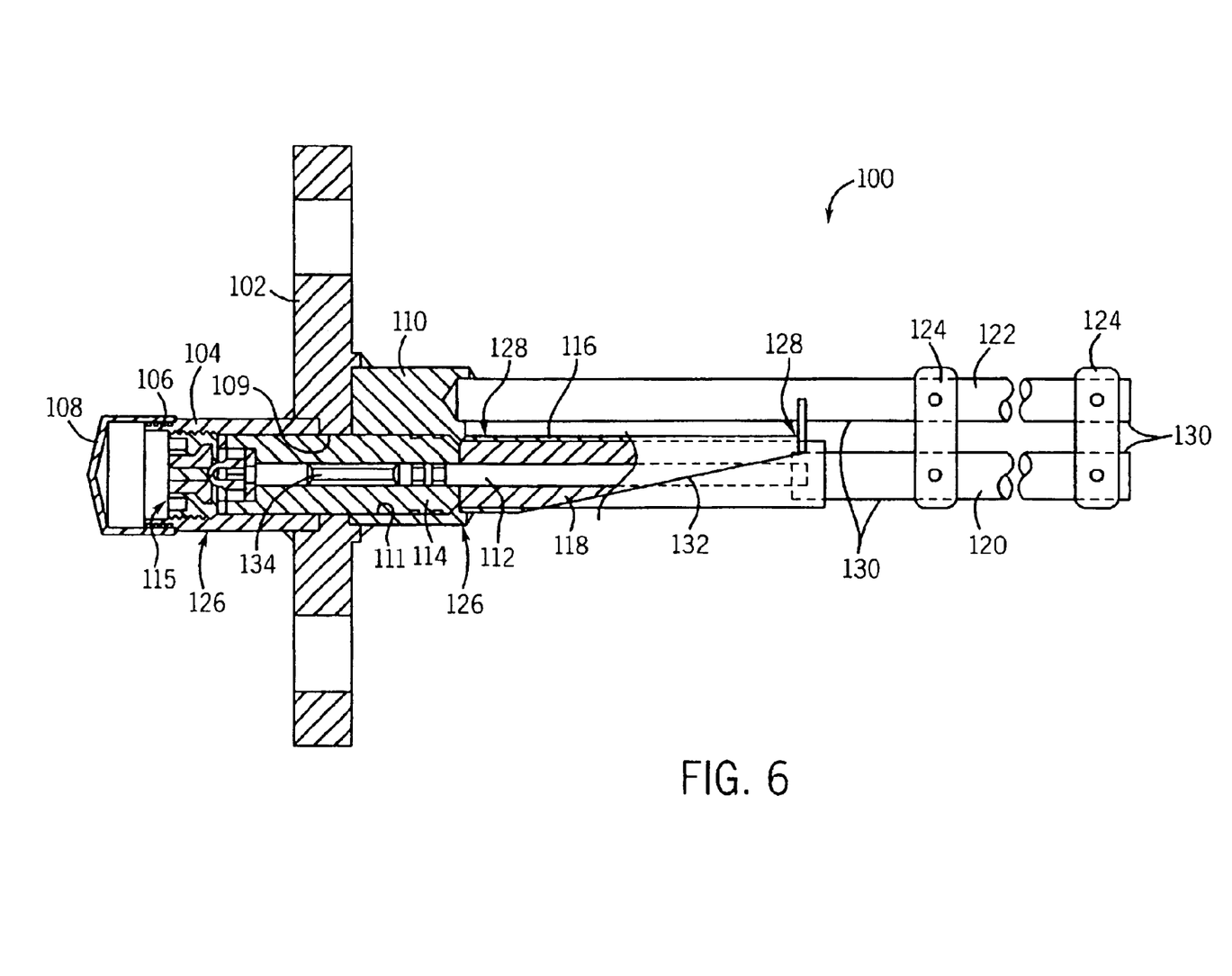
FIG. 6 is a sectional view of an alternative probe that can be used with the instrument of FIG. 1 including a separation segment.

Referring to FIG. 6, a twin rod probe 100 according to the invention is illustrated. The probe 100 includes mounting means, as a flange 102 or thread. A tubular fitting 104 extends outwardly from the flange 102. The fitting 104 has an outer threaded end 106 and is shown with a cap 108. In use, the cap 108 is removed so the fitting can threadably receive the instrument housing 22. A bushing 110 is welded to an inside of the flange 102 and has a through opening 111 coaxial with a flange opening 109 and the fitting 104. A transmission line conductor 112 is centered in the fitting 104 and bushing opening 111 with a spacer 114. A coaxial connector 115 is provided at an outer end of the conductor 112. A separation sleeve 116 is connected inwardly of the bushing 110, coaxial with and receiving the conductor 112. An additional Teflon spacer 118 is provided in the separation sleeve 116.

The probe 100 also includes a signal line 120 and a ground line 122 connected in parallel with spacers 124. The signal line 120 is secured to the conductor 112. The ground line 122 is fastened to the bushing 110. In accordance with the invention, the probe 100 includes a fiducial section 126 representing the area of the conductor 112 outwardly of the signal line 120 and ground line 122, a separation segment 128, and a level measuring segment 130. The level measuring segment 130 corresponds to location of of the signal line 120.

A coaxial cable (not shown) which is connected between the MIR circuitry 48 and probe 100 has an impedance of 50 ohms. The center conductor of the coaxial cable is connected through connector 115 with conductor 112. Fiducial section 126 has an input impedance of 50 ohms, matching the coaxial cable. Conductor 112 has a narrowed portion 134 within the fiducial section 126. This narrowed portion 134 has a greater spacing from flange 102 and bushing 110 than the remainder of conductor 112 and thus has a greater impedance, of the order of 75 ohms. The 25 ohm mismatch causes the fiducial return signal of FIG. 3. The output impedance of conductor 112, at the end of bushing 110, is also 50 ohms.

A coaxial probe (not shown) having an impedance of 50 ohms would match the impedance of fiducial section 126 and be connected directly to the end thereof. However, coaxial probes cannot be used in some conditions, as with the measurement of materials of high viscosity, which would tend to clog the space between the inner and outer conductors.

Figure 7:
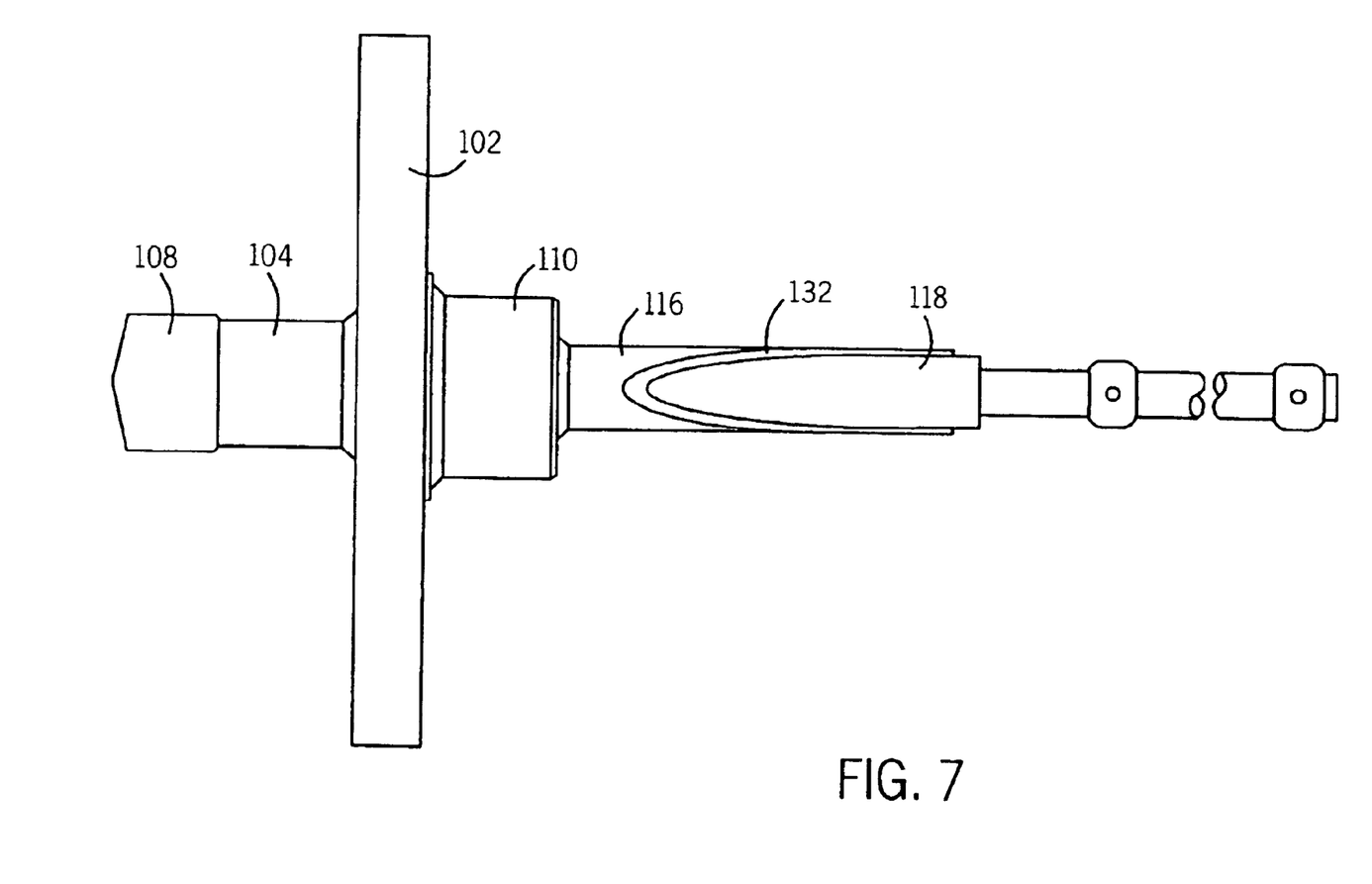
FIG. 7 is a side view of the probe of FIG. 6.

The twin rod probe shown in FIGS. 6 and 7 has a higher impedance than that of fiducial section 126, typically of the order of 150 ohms. Separation segment 128 provides an impedance match between fiducial section 126 and level measuring segment 130. Separation sleeve 116 surrounding conductor 112 beyond bushing 110 has an angled cut 132 which provides a gradual impedance change from 50 ohms to 150 ohms. This reduces reflections to the MIR circuitry 48 from the transition between conductor 112 and signal line 120. Teflon spacer 118 provides a stable mechanical connection between conductor 112 and signal line 120 and prevents liquids from entering fiducial section 126.

The control circuit 30 has the capability of digital communication through the two-wire circuitry 40 and line 42 with remote devices and the outside world. Such communication preferably uses the HART protocol.

Thus, in accordance with the invention, there is described a TDR measurement instrument which uses zoom scaling for improved measurement, self diagnostics, and improved probe design for certain applications.

We claim:

1. A probe defining a transmission line for use with a time domain reflectometry measurement instrument including a pulse circuit connected to the probe for generating pulses on the transmission line and receiving reflected pulses on the transmission line, the reflected pulses representing impedance changes on the transmission line, the probe comprising:

a first segment having a transmission line conductor for connection to the measurement instrument, the first segment having a first impedance;

a level measuring segment comprising a signal line having a second impedance higher than the first impedance; and a separation segment operatively connected between the first segment and the level measuring segment for electrically connecting the transmission line conductor to the signal line and providing an impedance match between the first segment and the level measuring segment.

2. The probe of claim 1 wherein the separation segment has an impedance that gradually changes from the first impedance to the second impedance.

3. The probe of claim 1 wherein the separation segment has a sleeve surrounding the transmission line conductor and the sleeve includes an angled cut so that impedance gradually changes from the first impedance to the second impedance.

4. The probe of claim 1 wherein the first segment comprises a narrowed portion of the transmission line conductor to define a fiducial for the time domain reflectometry measurement instrument.

5. The probe of claim 1 wherein the level measuring segment comprises a twin rod probe.

6. A probe defining a transmission line for use with a measurement instrument including a pulse circuit connected to the probe for generating pulses on the transmission line and receiving reflected pulses on the transmission line, the reflected pulses representing impedance changes on the transmission line, the probe comprising:

mounting means for mounting to a process vessel;

a transmission line conductor fixedly mounted relative to the mounting means;

a signal line secured to the conductor;

a ground line connected and parallel with the signal line; and a separation sleeve fixedly mounted relative to the mounting means and coaxial with and receiving the conductor, the separation sleeve being adapted to provide a gradual impedance change along its length.

7. The probe of claim 6 wherein the separation sleeve includes an angle cut so that impedance gradually changes along its length.

* * * * *